United States Patent [19]

Meeder et al.

[11] Patent Number: 4,558,437
[45] Date of Patent: Dec. 10, 1985

[54] SEAFLOOR VELOCITY AND AMPLITUDE MEASUREMENT APPARATUS AND METHOD THEREFOR

[75] Inventors: Charles A. Meeder, Aurora; Anthony R. Tinkle; Kenneth R. Wener, both of Littleton, all of Colo.

[73] Assignee: Marathon Oil Company, Findlay, Ohio

[21] Appl. No.: 366,039

[22] Filed: Apr. 5, 1982

[51] Int. Cl.[4] ........................... G01V 1/16; G01V 1/38
[52] U.S. Cl. ........................................ 367/15; 181/110
[58] Field of Search ........................ 367/15, 16, 14, 33, 367/89, 141, 191, 19, 27, 33; 181/108, 110, 112, 114, 118, 120, 122, 124

[56] References Cited

U.S. PATENT DOCUMENTS

| Re. 27,750 | 9/1973 | Daniels et al. | 367/106 X |
|---|---|---|---|
| 2,480,561 | 8/1949 | Ewing et al. | 367/106 |
| 3,233,694 | 2/1966 | Roever | 181/118 |
| 3,350,683 | 10/1967 | Sengbush | 367/16 |
| 3,379,273 | 4/1968 | Chelminski | 181/118 X |
| 3,912,042 | 10/1975 | Pauletich | 181/118 |
| 4,302,824 | 11/1981 | Goymour | 367/19 |
| 4,376,301 | 3/1983 | Roberts | 367/19 |
| 4,405,036 | 9/1983 | Wener et al. | 367/15 X |
| 4,446,538 | 5/1984 | Zachariadis | 367/19 |

Primary Examiner—Nelson Moskowitz
Assistant Examiner—Brian Steinberger
Attorney, Agent, or Firm—Jack L. Hummel

[57] ABSTRACT

The invention provides an improved method and apparatus (10) for measuring the velocity and amplitude of sound waves (150) from acoustic pulses (145) generated near the mudline (130) of the seafloor (120). The apparatus (10) includes a seismic source (30) for generating the acoustic pulses, one or a plurality of vertically spaced sensors (50) located vertically below the seismic source (30) for sensing when the sound waves (150) impact the sensors (50), a hydrophone sensor (200) located on the vessel (60) for measuring the distance to the seismic source (30) a crane and winch for pulling the embedded sensors (50) upwardly and out from the sediments, and means (100) for firing the seismic source when said sensors (50) are being pulled upwardly, for taking amplitude and velocity measurements from each sensor, and for determining the distance the sensors have been pulled upwardly for each acoustical pulse operation.

5 Claims, 5 Drawing Figures

SEAFLOOR VELOCITY AND AMPLITUDE MEASUREMENT APPARATUS AND METHOD THEREFOR

TECHNICAL FIELD

The present invention relates to a method and apparatus for measuring acoustic wave velocities and amplitudes in the sediments of the seafloor and, more particularly, to methods and apparatuses which measure acoustic velocities and amplitudes through vertical layers of sediments.

BACKGROUND ART

This invention represents an improvement to the invention set forth in U.S. Pat. No. 4,405,036 issued on Sept. 20, 1983 to Wener, et al. entitled "Seafloor Velocity and Amplitude Measurement Apparatus and Method" which is presented in FIG. 1 and discussed subsequently. However, prior to the filing of this patent, a patentability search was performed and the following patents were found:

| Inventor | Patent No. |
|---|---|
| F. K. Levin | 3,193,045 |
| G. B. Loper et al | 3,219,968 |
| J. I. Ewing et al | 3,274,608 |
| R. L. Sengbush | 3,350,683 |
| J. H. Cawley et al | 3,441,901 |
| Kenneth E. Burg | 3,644,882 |
| Hilmi F. Sagoci | 3,831,136 |
| Cook et al | 4,016,531 |
| William D. Jenkinson | 4,079,353 |

The 1972 patent to Burg (U.S. Pat. No. 3,644,882) relates to a marine acoustic velocity profiling system wherein a plurality of hydrophones are pulled rearwardly of the boat to receive acoustic reflections from the water layer which are generated by an acoustic source. The Burg system sequentially energizes the acoustic source to generate acoustical waves that travel downwardly into the water and into the shallow sediments below the water floor. The activation of the acoustical source is synchronized with the distance of travel by the boat. In the Burg approach, the acoustic source and the hydrophones are located in the same marine transverse plane remotely located above the water floor.

In the 1969 patent issued to Cawley et al (U.S. Pat. No. 3,441,901), a system of measuring sound velocity in water is set forth wherein a sonar transducer located underneath the boat generates acoustic waves which are subsequently detected by a hydrophone. The hydrophone is connected by means of a wire cable to the rear of the boat. Based upon the physical relationship between the hydrophone and the acoustic source, velocity of sound can be measured through the water.

The 1967 patent issued to Sengbush (U.S. Pat. No. 3,350,683) relates to a method of reducing the amplitude of water reverberations in marine seismograms. Like Burg, Sengbush utilizes a seismic source which in this case is attached to the bottom of the boat to produce seismic waves which travel downwardly to the ocean subsurface. The acoustic waves are then reflected upwardly into a detector which is pulled rearwardly of the boat. The detector in the Sengbush approach is maintained at a predetermined known depth. The maintenance of the detector at this depth minimizes reverberations.

The 1978 patent issued to Jenkinson (U.S. Pat. No. 4,079,353) relates to an offshore seismic surveying technique which utilizes a seismic source located beneath a boat generating acoustic waves for reflection into the subocean bottom. The reflected waves are sensed by a plurality of hydrophones which are pulled rearwardly of the boat (or to the side by another boat). The purpose of the invention is to locate scar zones on the floor of the bottom of the water.

The 1977 patent issued to Cook et al (U.S. Pat. No. 4,016,531) relates to a system for recording seismic reflection signals in a certain format. Cook et al utilizes a seismic source located beneath a boat which pulls a series of hydrophones. The invention relates to a technique for activating the acoustic source and processing the data received by the hydrophones.

The 1974 patent issued to Sagoci (U.S. Pat. No. 3,831,136) also relates to a method of analyzing seismic data generated from a boat carrying a seismic source and pulling a number of hydrophones on a towing cable.

The 1966 patent issued to Ewing et al (U.S. Pat. No. 3,274,608) also relates to a seismic profiler system wherein a first boat tows a seismic source for generating acoustic waves into the water which are then reflected into a hydrophone pulled by the same or a second boat. In the Ewing approach, a unique recording drum is utilized for profiling the seismic data.

The 1965 patent issued to Loper et al (U.S. Pat. No. 3,219,968) relates to a method and system for recording repetitive seismic signals from a boat carrying a seismic source beneath the boat and pulling a detector rearwardly of the boat coupled to a diving vane. The Loper approach relates to a particular technique in recording and analyzing the seismic data.

Finally, the 1965 patent issued to Levin (U.S. Pat. No. 3,193,045) relates to a boat containing both the seismic source and seismic detector located on the bottom of the boat. The purpose of the invention is to determine the depth of the water.

As will be presented in the discussion accompanying FIG. 1, it is believed that the approach set forth in FIG. 1 is more pertinent than any of the above prior patented approaches. Specifically, none of the above patents, uncovered in the search, set forth or even suggest an apparatus or method wherein the receiving hydrophones or sensors are actually located in the seafloor sediments.

DISCLOSURE OF THE INVENTION

The problem faced in measuring pressure wave velocities and amplitudes from acoustic pulses in various sedimentary layers in the seafloor is to formulate an apparatus and method for measuring the vertical velocity of the pressure wave through different layers of sediment at a number of different locations in the sediment. To increase the resolution of the data pertaining to the different sediment layers, it would be necessary to place a large number of separate hydrophone sensors actually in the sediment, to provide a large number of cables between those sensors and a remote vessel, and to provide a corresponding large number of separate electronic recording channels to observe the data. This approach is practically unrealistic in that it is high cost.

The improved seafloor velocity and amplitude measurement apparatus and method of the present invention provides a solution to the problem by providing a referenced sensor located at the vessel for accurately determining the position of the embedded sensors in the seafloor so that as the embedded sensors are pulled upwardly from the sediments a large number of separate readings at differing locations in the sediments can be made without an actual increase in the number of sensors in the sediments, without an actual increase in the number of cables between the sensors and the vessels, and without an increase in the number of the electronic channels for recording.

The addition of the hydrophone sensor at the vessel permits the recording electronics to determine the position of the apparatus in the sediments at any given time. Because the sensors are moving upwardly at a relatively slow rate and because sound waves from the acoustic pulses rapidly travel through the sediments, during the time interval that the measurements are actually being taken by the sensors, the sensors appear to be in a static position with respect to the sediment.

DISCUSSION OF PRIOR ART APPROACH

Figure 1:
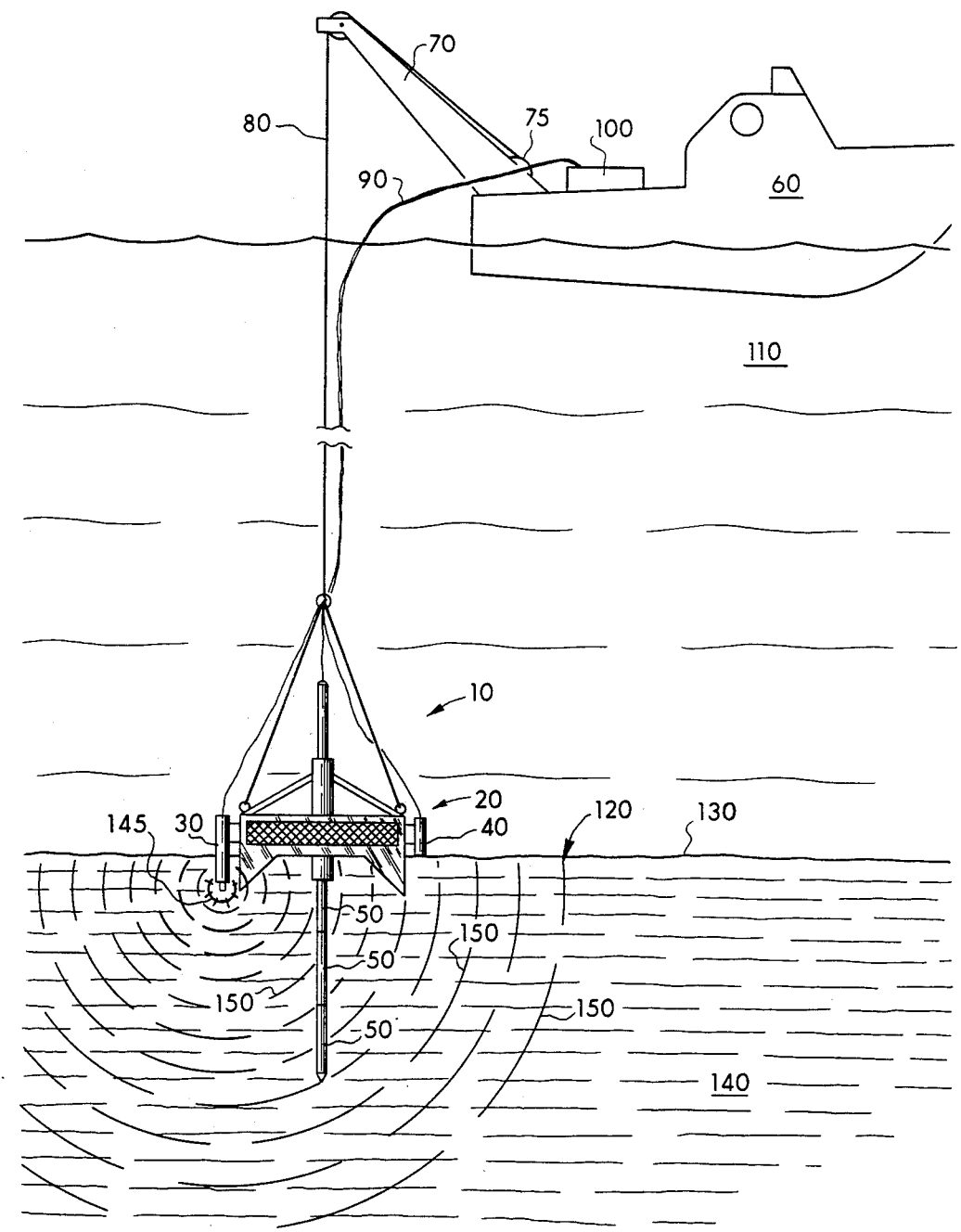
FIG. 1 sets forth an illustration of a prior art apparatus embedded at a desired test location in the seafloor.

The prior art approach set forth in FIG. 1 is the subject matter of the above-identified U.S. Pat. No. 4,405,036. The prior art apparatus 10 shown in FIG. 1 includes a ballast or carrier 20, a seismic source 30 for injecting an acoustic pulse, a reference sensor 40, and a plurality of vertically interconnected spaced sensors 50. A conventional boat 60 carries a crane 70 which by means of a winch 75 and a cable 80 is used to embed the prior art apparatus 10. A communications cable 90 interconnects the seismic source 30, the reference sensor 40 and the plurality of vertically interconnected sensors 50 with a set of recording electronics 100 located on the boat 60.

As shown in FIG. 1, the prior art apparatus is positioned in the water 110 over the seafloor 120. The seafloor consists of a mudline 130 and a number of layers of sediment generally designated 140. These layers of sediment 140 range in viscosity from low to high or from a thick fluid to a gelatin-like composition. The mudline 130 provides a point of reference between the water 110 and sediments 140 although it is to be expressly understood that the transition between the liquid 110 and the sediments 140 is often unclear.

As set forth in this patent the carrier 20 with the sensors 50 is embedded into the seafloor and once embedded, the seismic source 30 is activated to produce an acoustic pulse 145 which creates an acoustic pressure wave front 150 that travels outwardly from the seismic source 30. The disclosed arrangement in this prior art approach is a fixed geometry static arrangement which utilizes a predetermined number of sensors which, as shown in FIG. 1, comprise three separate sensors. By knowing the fixed geometry of the arrangement, geophysical properties of the sediments can be evaluated from their acoustic profiles.

While the embodiment in FIG. 1 shows three sensors 50, under the teachings of this approach more or less sensors could be utilized. Clearly, if more sensors are utilized greater resolution of the different layers of sediment can be achieved. However, a practical and economic limitation exists on increasing the number of sensors. For example, increasing the number of sensors significantly affects the cost of the apparatus due to the increased cost of sensors. Additionally there is a practical limitation on the number of cables (i.e., one for each sensor) that can be carried interior to the downwardly extending pipe carrying the sensors as well as the cost of these additional cables from the boat to the apparatus. Finally, increasing the number of sensors would increase the number of electronic channels in the recording electronics 100 which also results in an overall significant cost increase.

The improvement to the apparatus set forth in the next section provides an order of magnitude increase in the acoustic velocity and magnitude profile measurements of the sediments as well as significantly increasing the statistical reliability of the data for the upper layers of the sediment with no increase in the number of sensors in the sediments, with no increase in the number of cables to the boat, and with no increase in the number of recording channels.

BEST MODE FOR CARRYING OUT THE INVENTION

Figure 2:
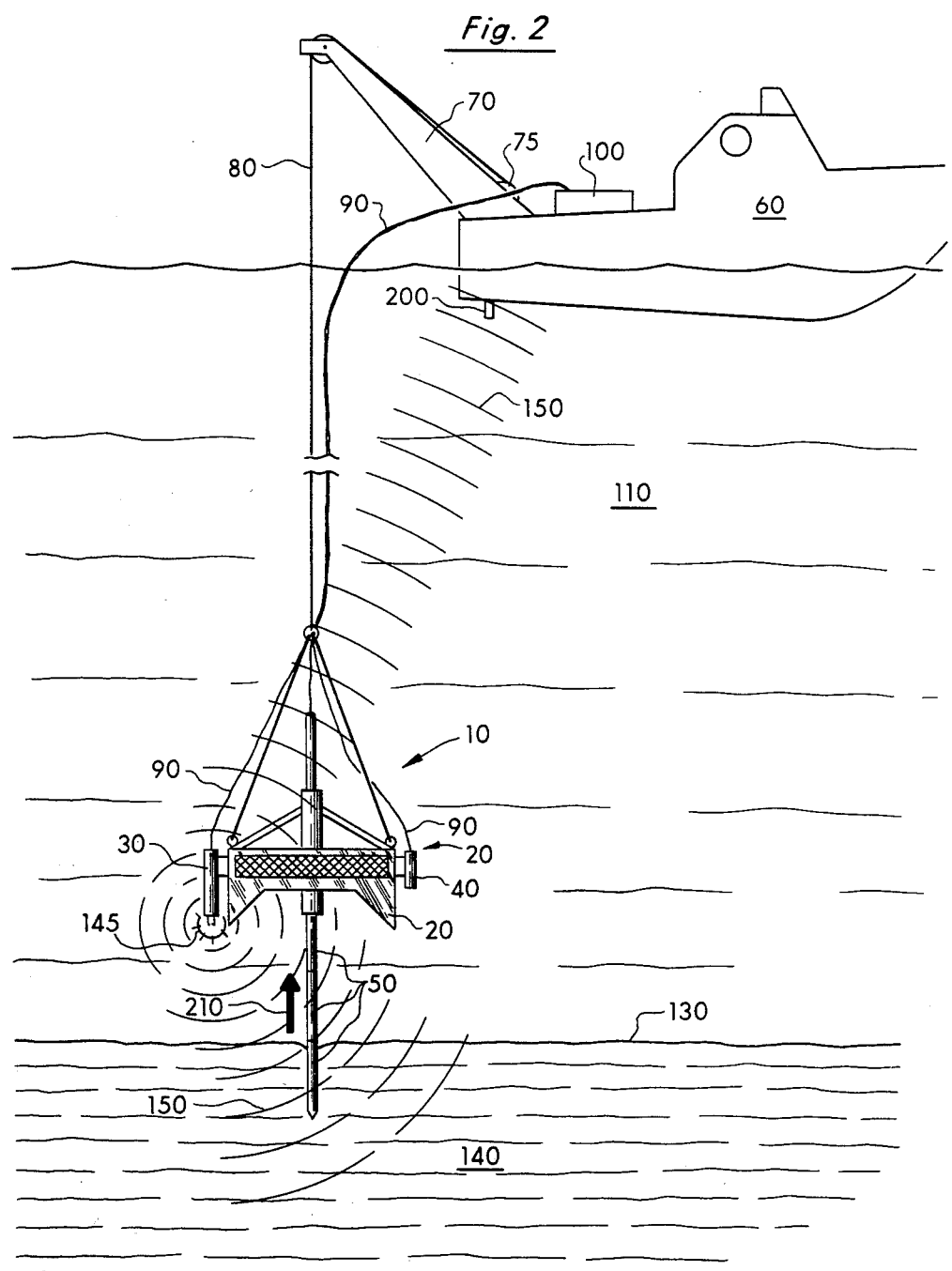
FIG. 2 sets forth an illustration showing the improvements to the apparatus of FIG. 1 as the apparatus is being pulled upwardly from the sediments of the seafloor.

In FIG. 2, the improved prior art approach of FIG. 1 is set forth. An additional hydrophone sensor 200 is located in the water near the boat or vessel 60 and, in the preferred embodiment, it is attached underneath the boat 60. The hydrophone sensor 200 also detects the wave front 150 from the acoustic pulse 145 by measuring the velocity of the sound wave (150). The hydrophone sensor 200 is conventionally available from Refraction Technology, Inc., 735 North Britain Road, Irving, Tex. 75061 as Model No. REF-TEK17. This conventionally available detector is a low impedance hydrophone utilizing a ceramic element in an insulated epoxy housing and uses a self-contained battery. The addition of the hydrophone sensor 200 on the boat 60 enables the apparatus 10 to take acoustic profile measurements of the sediments 140 as the apparatus 10 is being pulled upwardly in the direction of arrow 210 out from the sediments 140.

In operation, and in reference back to FIG. 1, the apparatus 10 takes an initial profile reading while it is implanted in the sediments 140. This is in accordance with the teachings of Ser. No. 215,591. The additional hydrophone sensor 200 also initially takes a reading which determines the distance between the seismic source 30 and the sensor 200. After the initial set of readings, the apparatus 10 is pulled upwardly by cable 80 and winch 75 on crane 70. In typical applications, the apparatus 10 is pulled out at a rate approximately equal to one foot per second (30 cm per second). While the apparatus 10 is being pulled out, acoustic pulses continue to be generated by the seismic source 30. In the preferred embodiment as the apparatus 10 is pulled out from the sediments 140, the seismic source 30 generates thirty acoustic pulses 145 during the time required for the apparatus 10 to be completely pulled out from the sediments 140. Because of the rate at which the sound wave 150 travels through the water 110 and the sediments 140, the profile measurements by sensors 50 are taken as if the apparatus 10 were in a static or stationary position. Hence, the improvement to the prior art approach of FIG. 1 effectuates an order of magnitude increase in the number of velocity measurements being taken in the sediments 140 thereby giving significantly greater resolution data on the geophysical properties of the sediments 140.

In the embodiment having a sensor spaced every ten feet (3 meters) the sensors in the embedded position project downwardly approximately thirty feet (9 meters) from the carrier 20. The sensors are separated every ten feet (3 meters) and, under the prior art approach, only average values for the various sediment layers 140 can be obtained at ten feet (3 meters) intervals. Under the present technique, however, the lowermost sensor 50a, as it is being pulled upwardly, will take thirty discrete readings of the sediments 140, the middle sensor 50b will take twenty discrete readings as it is being pulled upwardly, and the uppermost sensor 50c will take ten discrete readings before it is pulled out from the sediments 140. Hence, a total of sixty discrete readings of the sediment layers 140 are taken at an average spacing of one foot (30 cm) apart thereby increasing the resolution of the profile data by an order of magnitude (i.e., measurements taken every foot (30 cm) v. measurements taken every ten feet - 3 meters). Furthermore, and as will be discussed more fully, for a thirty foot (9 meters) sensor probe 50, the lowest ten feet (3 meters) of the sediments 140 will be measured once, the middle ten feet (3 meters) segment of the sediments 140 will be measured twice, and the upper ten feet (3 meters) of the sediments 140 will be measured three times thus significantly increasing the statistical reliability and reinforcement of the data for the upper layers of the sediment 140.

Figure 3:
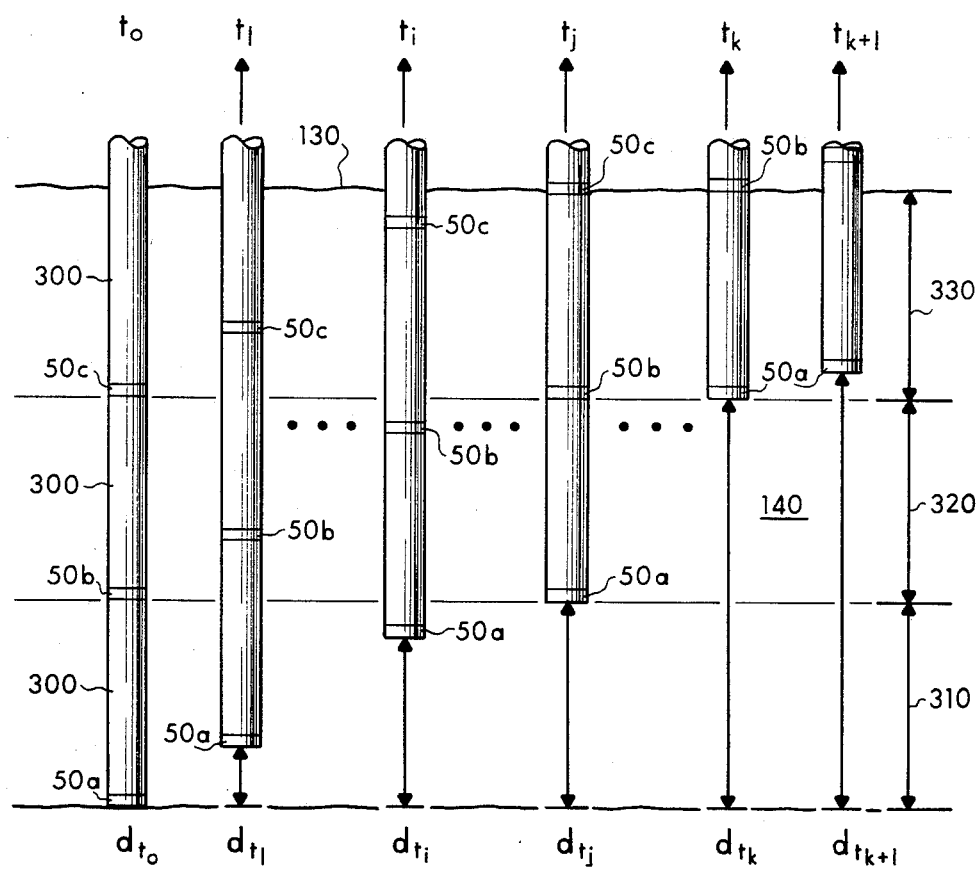
FIG. 3 is a diagram setting forth the various positions of the hydrophone sensors at different time intervals under the teachings of the present invention.

In FIG. 3, a diagramatic representation of the method of the present invention is set forth. As shown, the sensors 50a, 50b, and 50c, are separated from each other by pipe sections 300. In this embodiment, the pipe sections 300 are of equal length thereby causing the sensors 50 to be located at predetermined distances 310, 320, and 330 in the sediments 140 when embedded as shown in FIG. 1. Subsequently, the winch 75 is activated to pull the apparatus 10 upwardly. While being pulled upwardly in the direction of arrow 210, an acoustic pulse 145 is generated at $t_1$ under control of the recording electronics 100. The sound waves 150 are immediately generated and quickly impact upon sensors 50a, 50b, and 50c. Because the sound waves 150 travel at approximately 5,000 feet per second (1500 meters per second), the sensors appear to be stationary or static even though they are traveling upwardly in the direction of arrow 210. In other words, the sensors 50 are being pulled up at the rate of one foot per second (0.30 meters per second) whereas the sound wave 150 impacts at the rate of 5,000 feet (1500 meters) per second. While still being pulled upwardly by winch 75, a series of acoustic pulses 145 are then generated. At time $t_j$, the acoustic pulse 145 generated at that time finds the sensor 50a located at approximately the position that sensor 50b occupied at time $t_o$. As additional acoustic pulses 145 are generated and as the apparatus 10 is lifted further upwardly in the direction of arrow 210, sensor 50a at time $t_k$ generally is in the region of the sediments 140 that sensor 50c occupied at time $t_o$ and that sensor 50b occupied at time $t_j$.

In the preferred embodiment, approximately ten acoustic pulses 145 are generated in the time that sensor 50a travels distance 310 or approximately once every foot of travel upwardly an acoustic pulse 145 occurs and three measurements are taken by sensors 50a, 50b, and 50c. From time frame $t_j$ to $t_k$, sensor 50a will retake measurements in distance 320 and sensor 50b will retake measurements in distance 330. Finally, from time $t_k$ to when sensor 50a passes the mudline 130, for a distance of 330, a third set of measurements for the sediments in 330 are taken. Hence, the acoustic profile of the velocity and amplitude sediments in distance 310 are taken once, the acoustic profile of the sediments in layer 330 are taken three times. Such a method statistically reenforces the acoustic velocity and amplitude data of the upper sediment layers.

In the preferred embodiment any high resolution acoustic source is acceptable such as a tunable 3-7 kHz transducer manufactured by Ocean Research Equipment, Inc., P.O. Box 709, Falmouth, Me. 02541 as Model No. 137-D. Under the teachings of this invention the rate of acoustic pulse generation can be varied.

Figure 4:
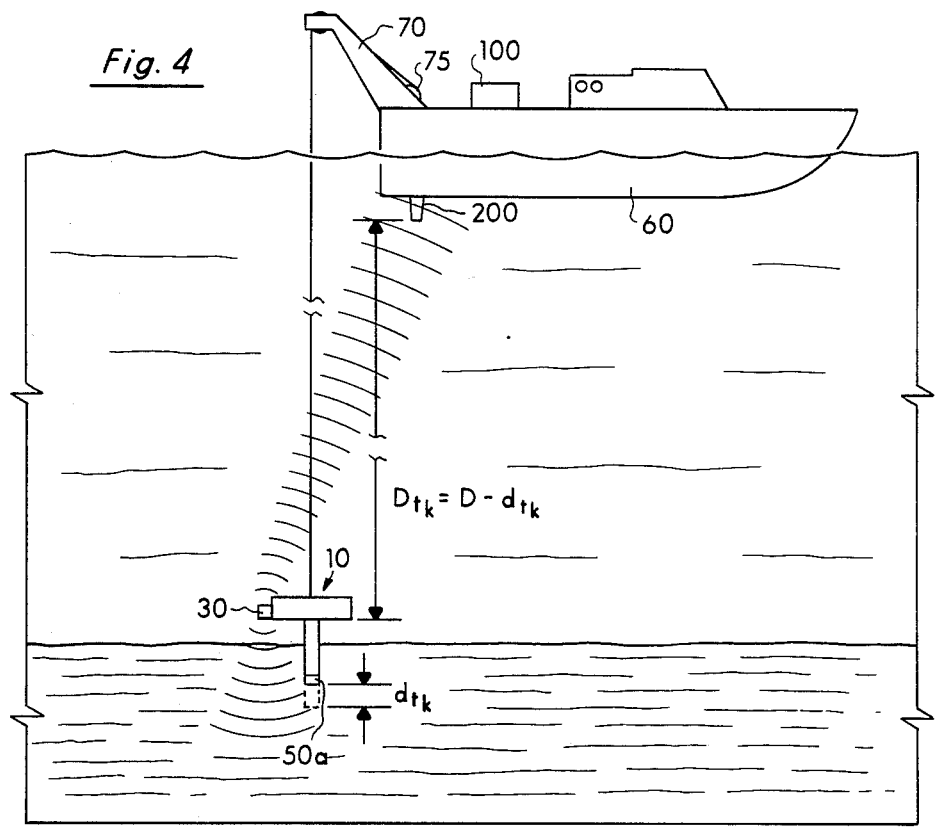
FIG. 4 is an illustration detailing how the sensor located on the vessel is capable of determining the position of the embedded apparatus as it is pulled upwardly from the seafloor.

In FIG. 4, the importance of the hydrophone sensor 200 becomes clear. It is important to precisely determine the distance $D_{tk}$ in order to ascertain the level in the sediments the sensor, such as, for example, sensor 50a, is located. Hence, when the apparatus 10 is embedded into the sediments 140 as shown in FIG. 1 the precise distance D from the sensor 200 to the seismic source 30 is initially determined. It is to be expressly understood that an angular relationship does, in fact, exist between the location of the hydrophone sensor 200 and the seismic source 30. However, at the depths D at which the apparatus 10 is implanted into the ocean floor, for all practical purposes, the hydrophone 200 is assumed to be located vertically above the seismic source 30. Therefore, in the position of FIG. 1, the hydrophone 200 is utilized by the recording electronics 100 to determine the vertical distance, D. In the general case at time, $t_k$, as the apparatus 10 is being pulled upwardly from the sediments 140, an acoustical pulse 145 is generated and the wave front 150 from that acoustical pulse 145 is sensed by the hydrophone sensor 200 to measure the velocity of the sound wave (150) and, therefore, the distance D can be determined based upon the time elapsed from the injection of the acoustic pulse at $t_k$ to the receipt of the sound wave at a later time by the sensor (200) $D_{tk}$. In other words, the hydrophone sensor (200) in cooperation with the recording electronics (100) determines:

$$D_{tk} = D - d_{tk} \qquad \text{(Formula 1)}$$

$$d_{tk} = D - D_{tk} \qquad \text{(Formula 2)}$$

It is to be expressly understood that horizontal times and distances are actually present, and in the preferred embodiment are determined. However, the above formulas represent the vertical values which are substantially greater than the horizontal values and, hence, approximate the true values.

It is clear from inspection of FIG. 4 that the winch 75 can pull the apparatus 10 upwardly at a rate independent of the recording electronics 100 control of the firing rate for the seismic source 30. The distance $d_{tk}$ can be determined through use of the hydrophone 200 independent of the rate at which the apparatus 10 is pulled upwardly. It is to be further observed, that the recording electronics 100 can control the rate at which the seismic source is fired (i.e., the rate at which the acoustic pulses 145 are generated).

Figure 5:
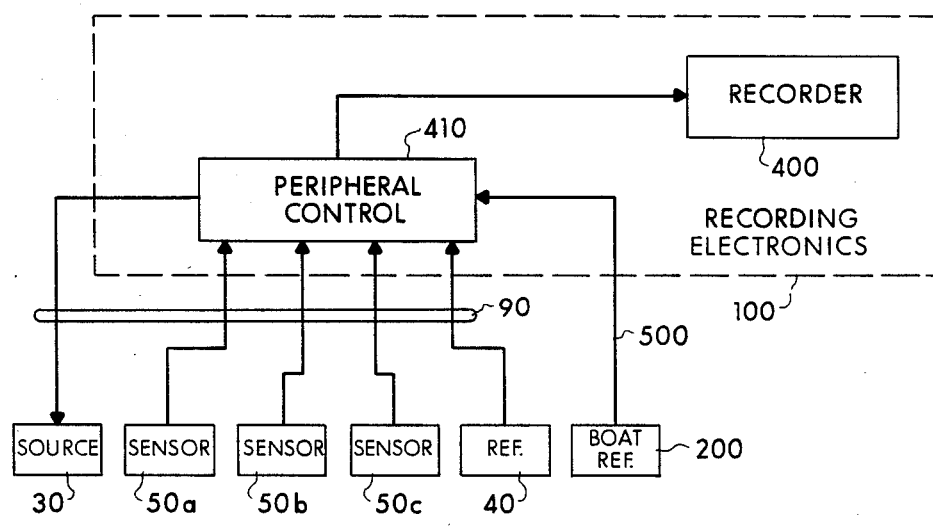
FIG. 5 is a block diagram of the recording electronics and the seismic source and sensors.

In FIG. 5, the electronic block diagram of the improved approach is set forth to include the recording electronics 100 having the recorder 400 and the peripheral control 410. It is to be expressly understood that the recording electronics 100 is conventional and can comprise a number of different computerized approaches. The peripheral control 410 receives electrical signals over cable 90 from sensors 50a, 50b, 50c, and 40. It sends out firing signals to the seismic source 30. The configuration of the recorder 400, the peripheral control 410, the source 30, and sensors 50a, 50b, 50c, and 40 are the same as that in the prior art approach shown in FIG. 1 and are old in the art. However, the addition of the sensor 200 which provides a reference to the boat has been added and enables the apparatus to be significantly used with greater resolution as heretofore explained. A signal is generated by sensor 200 on cable 500 to the peripheral control and the recording electronics 100 utilizes this information to determine the distance $d_{tk}$. With this information the location of each sensor 50a, 50b, and 50c, in the fixed geometry of the carrier, can be determined in relationship to the sediments 140.

From the geometric relationships involved it can be seen that the position of the source is not critical and that it can be positioned on or off of the carrier provided the above discussed relationships are known.

The apparatus and method of the present invention have been specifically set forth in the above disclosure, but it is to be understood that modifications and variations to both the method and apparatus can be made which would still fall within the scope and coverage of the appended claims herewith.

For example, the number of acoustical pulses which are generated by seismic source 30 can be increased or decreased as the apparatus 10 is being pulled upwardly. The rate at which the apparatus 10 is pulled by the winch 75 can be linear throughout the sediments or it can be non-linear under the teachings of the present invention. The number of sensors 50 can be decreased or increased and the length of the pipe sections 300 can be changed and need not necessarily be of equal spacings between the sensors 50. And, the actual technique for measuring the distance $D_{tk}$ (and, therefore $d_{tk}$) can be varied such that and, for example, the length of the cable 80 can be used for these measurements without departing from the teachings set forth in the following claims. Finally, all of the measurements could be made while the invention is being put into the seafloor.

We claim:

1. An improvement to an apparatus (10) operatively connected to a vessel (60) for measuring the velocity and amplitude of sound waves (150) from an acoustic pulse (145) passing through layers of sediments (140) with receivers (50) located below the mudline (130) of the seafloor (120), said apparatus (10) having a carrier (20), means (30) mounted to said carrier (20) for injecting said acoustic pulses (145) near said sediments (140), one or a plurality of interconnected vertically spaced sensors (50) embedded into said sediments (140), each of said sensors (50) being substantially vertically spaced below said injecting means (30) on said carrier (20) and being capable of sensing each of said sound waves (150) for generating an electrical signal representative of said sensed velocity and amplitude, said carrier (20) being capable of embedding said plurality of interconnected vertical sensors (50) into said sediments (140), and means (70, 75) on said vessel (60) connected to said carrier (20) for moving said embedded vertical sensors (50) upwardly through said sediments (140) at a given velocity, said improvement comprising:

said injecting means (30) being further capable of injecting said acoustic pulses at predetermined times ($t_k$), said one or plurality sensors (50) being further capable of generating said electrical signal corresponding to each injected acoustic pulse at each said predetermined time ($t_k$), means (200, 100) located substantially vertical above said sensors (50) and sensing each of said sound waves (150) produced by each acoustic pulse at said predetermined times ($t_k$) for determining the distance ($d_{tk}$) that said one or plurality of sensors (50) have moved upwardly between successive acoustic pulses (145) while said moving means (70, 75) upwardly lifts said carrier (20), and means (100) respective of said electrical signals from said one plurality of sensors (50) and receptive of said determined distance ($d_{tk}$) from said determining means (200, 100) for measuring the velocity and amplitude of each said pressure wave through said layers of sediment between said successive acoustic pulses.

2. An improvement to an apparatus (10) operatively connected to a vessel (60) for measuring the velocity and amplitude of sound waves (150) from an acoustic pulse (145) passing through layers of sediments (140) with receivers (50) located below the mudline (130) of the seafloor (120), said apparatus (10) having means (30) for injecting said acoustic pulses (145) near said sediments (140), one or a plurality of interconnected vertically spaced sensors (50) embedded into said sediments (140), each of said sensors (50) being substantially vertically spaced below said injecting means (30) and being capable of sensing each of said sound waves (150) for generating an electrical signal representative of said sensed velocity and amplitude, said sensors (50) being embedded into said sediments (140), and means (70, 75) on said vessel (60) connected to said sensors (50) for moving said embedded vertical sensors (50) upwardly through said sediments (140) at a given velocity, said improvement comprising:

means (200) located substantially vertical above said sensors (50) on said vessel (60) and responsive to each of said sound waves (150) from said injecting means (30) for determining the distances ($d_{tk}$) the sensors (50) have moved upwardly between successive acoustic pulses (145) while said moving means (70, 75) upwardly lifts said sensors (50), and means (100) receptive of said electrical signals corresponding to said sensed velocity and amplitude of each acoustic pulse from said one or plurality of sensors (50), and receptive of said determined distance ($d_{tk}$) from said determining means (200) for determining the actual velocity and amplitude of each said pressure waves through said layers of sediment between said successive acoustic pulses wherein said given velocity of said sensors caused by said moving means is removed from said sensed velocity.

3. An improvement to an apparatus (10) operatively connected to a vessel (60) for measuring the velocity and amplitude of sound waves (150) from an acoustic pulse (145) passing through layers of sediments (140) with receivers (50) located below the mudline (130) of the seafloor (120), said apparatus (10) having a carrier (20), means (30) mounted to said carrier (20) for injecting said acoustic pulses (145) near said sediments (140), one or a plurality of interconnected vertically spaced sensors (50) embedded into said sediments (140), each of said sensors (50) being substantially vertically spaced below said injecting means (30) on said carrier (20) and being capable of sensing each of said sound waves (150) for generating an electrical signal representative of said sensed velocity and amplitude, said carrier (20) being capable of embedding said plurality of interconnected vertical sensors (50) into said sediments (140), and means (70, 75) on said vessel (60) connected to said carrier (20) for moving said embedded vertical sensors (50) upwardly through said sediments (140) at a given velocity, said improvement comprising;

a hydrophone (200) located substantially vertical above said carrier (20), on said vessel (60), and receptive of each of said pressure waves (150) from each acoustical pulse (15) generated at time, $t_k$, for generating a signal representative of the distance ($d_{t_k}$) that the carrier (20) has moved upwardly at said given velocity between successive acoustic pulses (145), and means (100) receptive of said velocity and amplitude signals from said plurality of vertical sensors (50) and of said distance signal ($d_{t_k}$) from said hydrophone (200) for measuring the velocity and amplitude of each of said pressure waves through said layers of sediment between said successive acoustic pulses (145).

4. An improved method for an apparatus (10) operatively connected to a vessel (60) for measuring the velocity and amplitude of sound waves (150) from an acoustic pulse (145) passing through layers of sediments (140) with receivers (50) located below the mudline (130) of the seafloor (120), said apparatus (10) having a carrier (20), means (30) mounted to said carrier (20) for injecting said acoustic pulses (145) near said sediments (140), one or a plurality of interconnected vertically spaced sensors (50) embedded into said sediments (140), each of said sensors (50) being substantially vertically spaced below said injecting means (30) on said carrier (20) and being capable of sensing each of said sound waves (150) for generating an electrical signal representative of said sensed velocity and amplitude, said carrier (20) being capable of embedding said plurality of interconnected vertical sensors (50) into said sediments (140), and means (70, 75) on said vessel (60) connected to said carrier (20) for moving said embedded vertical sensors (50) upwardly through said sediments (140) at a given velocity, said improved method for measuring the acoustical velocity and amplitude profiles of seafloor sediments (140) comprising the steps of:

injecting said series of acoustic pulses (145) near said sediments (140) at predetermined times ($t_k$) when said sensors (50) are being pulled upwardly by said moving means (70, 75), determining the distance ($d_{t_k}$) that the vertically spaced sensors (50) have moved upwardly at each predetermined time ($t_k$), and measuring the velocity and amplitude of each sound wave (150) from each acoustical pulse (145) with each sensor at each said predetermined time ($t_k$).

5. An improved method for an apparatus (10) operatively connected to a vessel (60) for measuring the velocity and amplitude of sound waves (150) from an acoustic pulse (145) passing through layers of sediments (140) with receivers (50) located below the mudline (130) of the seafloor (120), said apparatus (10) having a carrier (20), means (30) mounted to said carrier (20) for injecting said acoustic pulses (145) near said sediments (140), one or a plurality of interconnected vertically spaced sensors (50) embedded into said sediments (140), each of said sensors (50) being substantially vertically spaced below said injecting means (30) on said carrier (20) and being capable of sensing each of said sound waves (150) for generating an electrical signal representative of said sensed velocity and amplitude, said carrier (20) being capable of embedding said plurality of interconnected vertical sensors (50) into said sediments (140), and means (70, 75) on said vessel (60) connected to said carrier (20) for moving said embedded vertical sensors (50) upwardly through said sediments (140) at a given velocity, said improved method comprising the steps of:

injecting a series of acoustic pulses (145) substantially vertical above said sensors (50) near said sediments (140) at predetermined times ($t_k$) when said sensors (50) are being pulled upwardly by said moving means, determining the distance ($d_{t_k}$) that the vertically spaced sensors (50) have moved upwardly at each predetermined time ($t_k$) by measuring the velocity of the sound wave (50) from each acoustical pulse (145) with a sensor (200) located on said vessel (60), and measuring the velocity and amplitude of each sound wave (150) from each acoustical pulse (145) with each sensor at each said predetermined time ($t_k$).

* * * * *